United States Patent Office 3,141,104
Patented July 14, 1964

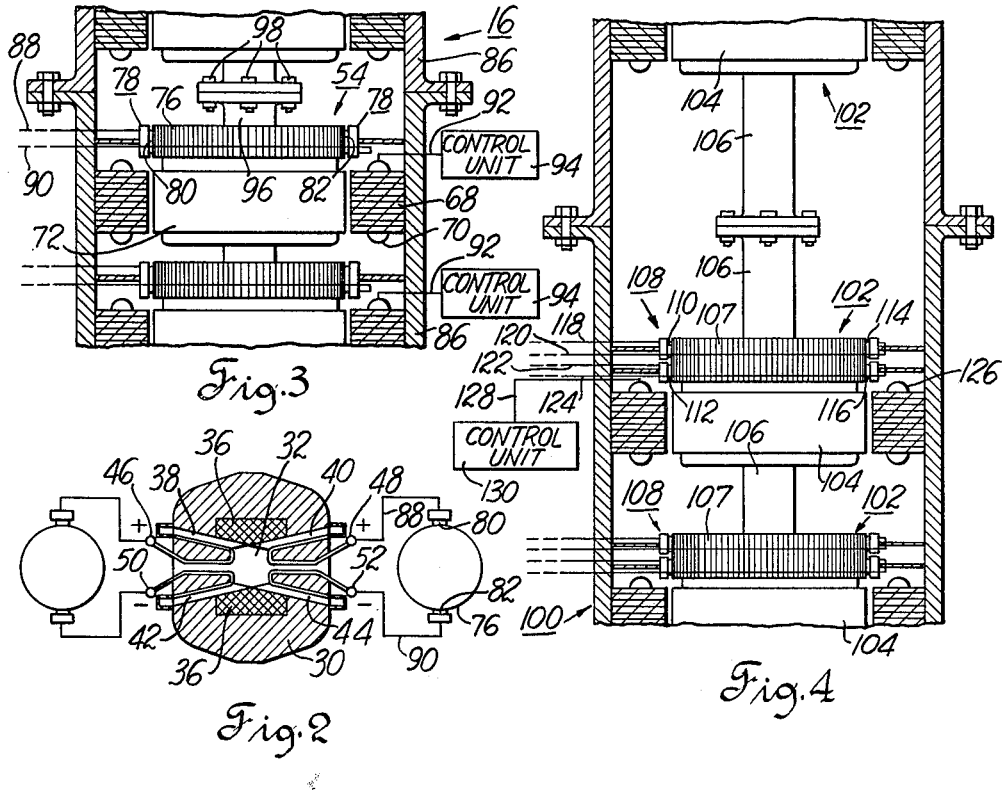

1

3,141,104
ELECTRICAL CONVERTER
Edward F. Brill, Brookfield, Wis., assignor to Allis-Chalmers Manufacturing Company, Milwaukee, Wis.
Filed Mar. 27, 1962, Ser. No. 182,848
7 Claims. (Cl. 310—112)

This invention relates generally to electrical converters. More particularly it relates to converters for use with electrical power generators, such as magnetohydrodynamic (MHD) generators, which have a multiplicity of power output terminals along their length.

The MHD principle of generating electrical power by moving an electrically conductive fluid, such as a hot ionized gas or plasma, through a magnetic field is well known. MHD generators exploiting this principle can be adapted to provide either an alternating current or direct current power output. Presently, large scale MHD generators which provide a D.C. power output have certain technical advantages and the D.C. power they produce is converted to A.C. by means of inverters.

One type of MHD generator for producing large amounts of D.C. power, i.e., on the order of 280 megawatts, comprises a body portion which is about 60 feet high and which has a vertical flow channel extending therethrough. The flow channel is adapted to accommodate the high velocity flow of hot, electrically conductive gases. Means are provided to generate a magnetic field in the flow channel so that the lines of force are transverse to the axis of the flow channel. Pairs of electrodes are spaced at intervals along the flow channel to collect the electric current generated as the electrically conductive gas moves through the magnetic field. The two electrodes in each pair are located on opposite sides of the flow channel and are arranged so that the shortest path between them is transverse both to the axis of the flow channel and to the magnetic lines of force. When the MHD generator is in operation, a D.C. potential difference is established across the electrodes in each pair. Characteristically, the Hall effect and certain variable conditions within the generator result in different voltages across each pair of electrodes along the flow channel. Thus, each pair of electrodes must normally be connected to a separate inverter.

The large physical size of the MHD generator and the requirement for a multiplicity of separate inverters poses certain problems. Mercury arc type power inverters, for example, can be employed but this requires an electron tube assembly, an inverter transformer, D.C. reactors and a bank of capacitors for each pair of electrodes. Such an arrangement is costly and cumbersome and involves complicated installation problems in the case of a vertical MHD generator of the type hereinbefore described.

It is desirable, therefore, to provide improved inverter means which overcome the problems outlined hereinbefore, which are particularly well suited for use with the type of electrical generators hereinbefore described, and which have other important advantages from the standpoint of cost, construction, simplicity of operation, and maintenance.

Accordingly, it is an object of the present invention to provide improved electrical converters, i.e., devices employing mechanical rotation for transforming electrical energy from one form to another, which are adapted for use with electrical power generators having a multiplicity of sets of power output terminals along their length.

2

Another object is to provide such converters which comprise a rotating electrical machine, such as an alternator, which is in axial alignment with and adapted to be driven by a plurality of electric motors, and wherein each motor is adapted for energization from at least one set of output terminals on the generator.

Another object is to provide a converter of the aforesaid character which is adapted for use with a generator wherein each set of output terminals operates at a different electrical potential.

Another object is to provide an electrical converter of the aforesaid character wherein a plurality of the motor armatures are on the same shaft and are removable as a unit through the stator of the rotating electrical machine.

Another object is to provide improved converters of the aforesaid character which are adapted for use with generators which have sets of electrical output terminals disposed vertically therealong.

Another object is to provide an improved converter of the aforesaid character which comprises an alternator having a vertically disposed rotor which is in axial alignment with and adapted to be driven by axially aligned motor armatures and wherein each motor is adjacent the generator terminals from which it is energized.

Other objects and advantages of the invention will hereinafter appear.

The accompanying drawings illustrate preferred embodiments of the invention but it is to be understood that the embodiments illustrated are susceptible of modification with respect to details thereof without departing from the scope of the appended claims.

In the drawings:

FIG. 2 is a cross sectional view of the MHD generator taken along line II—II of FIG. 1 and shows schematically the manner in which the generator electrodes are connected to the converter;

FIG. 3 is an enlarged detailed view of a portion of one of the converters shown in FIG. 1; and FIG. 4 is a view similar to FIG. 3 showing a way of connecting the generator electrodes to an alternative form of converter.

Figure 1:
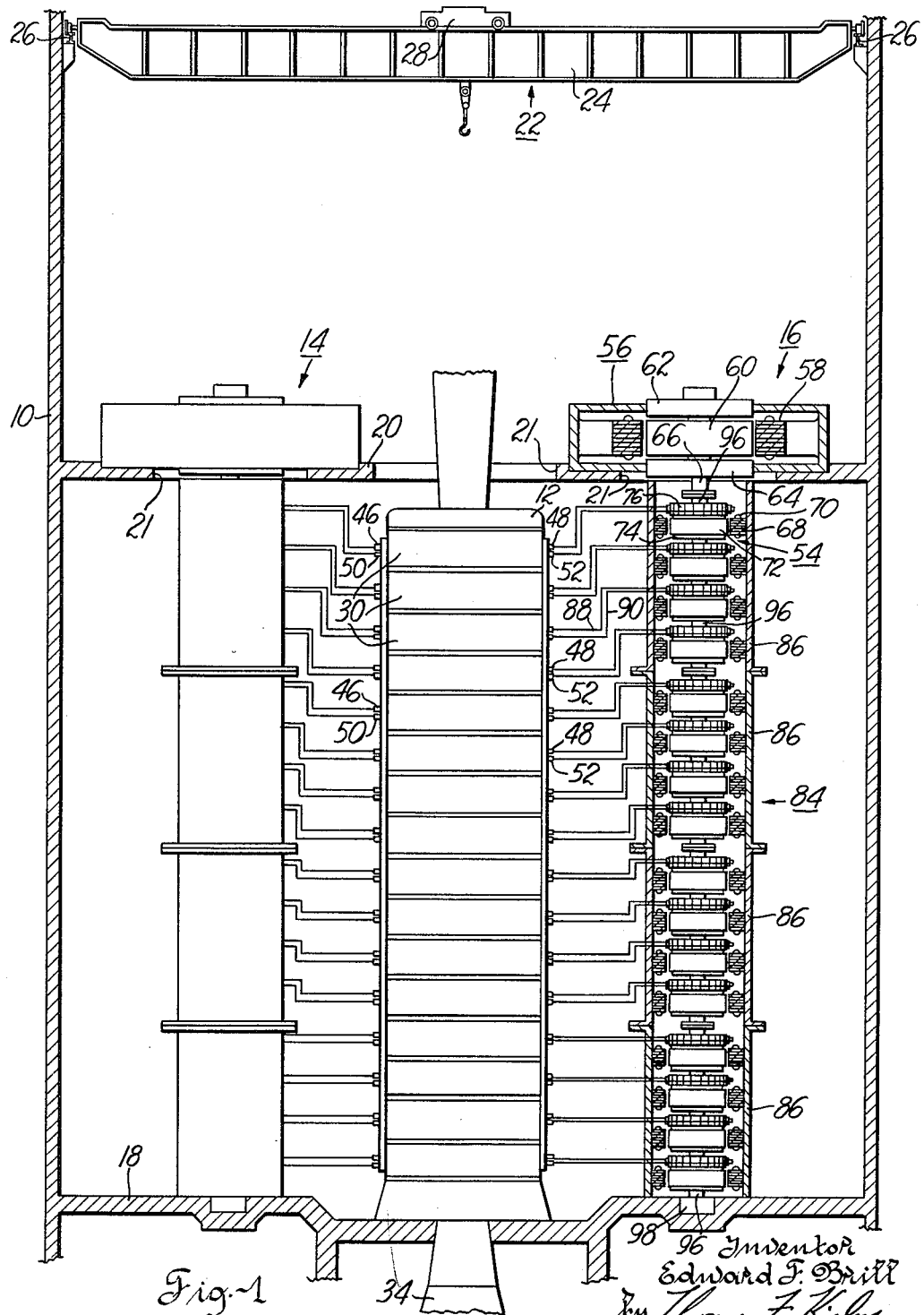
FIG. 1 is a view, partly in elevation and partly in section, of a portion of an electrical power house showing an MHD generator and electrical converters incorporating the invention arranged therein.

Referring to FIG. 1, the numeral 10 designates a powerhouse for housing an electrical power plant which comprises an electrical power generator, such as an MHD electrical power generator 12, and electrical converters 14 and 16 which are constructed and arranged in accordance with the present invention. MHD generator 12 is supported on a lower floor 18 of the powerhouse and the converters 14 and 16 are supported on and between lower floor 18 and an upper floor 20 of the powerhouse. Floor 20 of the powerhouse 10 is provided with suitable openings 21 which afford access to those portions of the equipment located therebelow. The powerhouse is provided with means, such as a traveling crane 22, which aids in the assembly and subsequent servicing of MHD generator 12 and the converters 14 and 16 which are understood to be constructed of large, heavy components. Crane 22 comprises a supporting member 24 which is adapted to travel along tracks 26 on powerhouse 10 and further comprises a hoist 28 which is adapted to travel along supporting member 24.

FIG. 1 discloses that MHD generator 12 is a type of large electrical power generator which has its power output terminals disposed vertically along the sides thereof and is, therefore, a type of generator with which the present invention is employed to best advantage. In the embodiment shown, there is a set of terminals on opposite sides of MHD generator 12 at a plurality of stations therealong and each set of terminals comprises a pair of terminals of opposite polarity. FIG. 1 shows that MHD generator 12 comprises a vertical stack of steel segments 30. For purposes of discussion, sixteen segments 30 are shown but it is to be understood that some other quantity could be employed.

FIG. 2 shows that a typical segment 30 of MHD generator 12 is provided with a central aperture 32 and it is to be understood that when the segments are stacked the central apertures align to provide a gas flow channel which extends vertically through the MHD generator. The gas flow channel is adapted to accommodate the flow of hot electrically conductive gas which is supplied from a source, such as a cyclone furnace 34, which is located below lower floor 18 of powerhouse 10. FIG. 2 further shows that a typical segment 30 of MHD generator 12 is adapted to accommodate electrodes which extend into the flow channel and collect the electrical power generated as the electrically conductive gas flows therethrough and through a magnetic field which is understood to exist therein. The magnetic field is provided by means of coils 36, which, as FIG. 2 shows, are disposed within MHD generator 12. FIG. 2 shows, for example, that each segment 30 of MHD generator 12 accommodates four electrodes designated 38, 40, 42 and 44 which are connected to power output terminals 46, 48, 50 and 52, respectively, which are arranged on the exterior of MHD generator 12 and which are understood to be electrically insulated therefrom and from each other. It is to be understood, for example, that when the generator is in operation and producing electrical power, the terminals 46 and 48 are positively charged and the terminals 50 and 52 are negatively charged. Furthermore, it is to be understood that it is characteristic of MHD generator 12 for each set of terminals to be at a different electrical potential than the others. For this and other reasons, it is not desirable to connect sets of terminals to common bus bars.

FIGS. 1 and 3 disclose one embodiment of an electrical converter which is constructed and arranged in accordance with the present invention. It is to be understood that the converters 14 and 16 shown in FIG. 1 are substantially identical and that, therefore, the detailed description of converter 16 which follows hereinafter also applies to converter 14.

Converter 16 is a device which relies on mechanical rotation to effect transformation of electrical energy from one form to another. For purposes of discussion it is to be understod that converter 16 is adapted to function as an electrical inverter, i.e., it converts direct current from MHD generator 12 into alternating current. However, converters which are adapted to effect other types of electrical transformation are understood to be within the scope of the present invention.

Converter 16 comprises a plurality of independently energizable motors, such as a D.C. electric motor 54 shown in FIGS. 1, 2 and 3, and further comprises a rotating electrical machine, such as an A.C. alternator 56 shown in FIG. 1 which is adapted to be driven by the motors.

As will be understood, alternator 56 is similar to well known types of large alternators which are used in hydroelectric power stations. It is to be understood, for example, that alternator 56 is adapted to be driven at a speed of about 164 r.p.m. and provides an output of three phase alternating current. Alternator 56 is supported on floor 20 of powerhouse 10 over one of the openings 21 and comprises a stator 58 and a rotor 60 which is rotatable about a vertical axis. Rotor 60 is supported by a bearing 62 at its upper end and a bearing 64 at its lower end and is provided with coupling means such as a flanged shaft 66. It is to be understood that rotor 60 of alternator 56 and the bearings 62 and 64 are adapted for vertical removal from stator 58 by means of crane 22 when servicing is required. When rotor 60 and the bearings 62 and 64 are removed, the diameter of the opening through stator 58 of alternator 56 is sufficiently large to permit the axial passage of the armatures of the motors 54 which will hereinafter be described.

FIGS. 1, 2 and 3 show the electric motors 54 which drive rotor 60 of alternator 56. In the embodiment of the invention shown in FIGS. 1, 2 and 3, MHD generator 12 is understood to be provided with sixteen sets of pairs of power output terminals along one side thereof. Accordingly, converter 16 comprises sixteen motors 54; one for each set for power output terminals. The motors 54 are vertically arranged in axial alignment with each other and with alternator 56 and each motor is located adjacent or as close as practicable to the power output terminals on MHD generator 12 from which it is adapted to be energized. In view of the large power output from each set of terminals on MHD generator 12, it is desirable to keep electrical connections thereto as short as possible to minimize power losses between it and alternator 16.

Each motor 54 comprises a magnetizable iron yoke 68 having suitable field coils 70 thereon. Each motor 54 further comprises an armature 72 which is provided with suitable armature windings 74 and a commutator 76 which, in accordance with the present invention, is the same diameter as the armature. Each commutator 76 is associated with a brush holder assembly 78 having brushes 80 and 82 which can be unsprung or withdrawn, when desired, so that the brush holder assembly can accommodate the axial passage therethrough of armature 72.

The motors 54 are enclosed and supported by means of a cylindrical casing 84 which, as FIG. 1 shows, is rigidly supported in vertical position between floors 18 and 20 of powerhouse 10. Preferably, for convenience in assembly, casing 84 is fabricated of a plurality of discrete casing sections 86 which are adapted to be secured together. FIG. 1 shows, for example, that casing 84 comprises four casing sections 86 and that each casing section accommodates four motors 54. As FIGS. 1 and 3 show, the yoke 68 and brush holder assembly 78 of each motor 54 is mechanically supported on the walls of its respective casing section 86.

FIGS. 1, 2 and 3 show schematically that each pair of terminals 48 and 52 of MHD generator 12 is electrically connected by means of conductors 88 and 90, respectively, to the brushes 80 and 82, respectively, of one of the motors 54. Thus, each motor 54 is energizable for rotation from a set of associated terminals. FIG. 3 further shows that the field coils 70 of each motor 54 are electrically connected, as by means of a conductor 92, to a separate control unit 94 which is adapted to be regulated, preferably automatically, to vary the magnetic field strength of the particular motor with which it is associated to regulate the speed thereof. Control unit 94 is understood to comprise standard control means for regulating the torque of a D.C. motor. In this manner, each motor in converter 16 which necessarily runs at the same speed as the others is adapted to provide the maximum torque with respect to the others despite differences in the electrical potential between sets of terminals on MHD generator 12.

FIGS. 1 and 3 also show that the armatures 72 of the motors 54 are in axial alignment with each other and with rotor 60 of alternator 56. As will be understood, armature 72 of each motor 54 is mechanically connected to the armature of the motor or motors adjacent it. In the embodiment shown in FIGS. 1 and 3, the armatures 72 of the motors 54 are constructed so that four armatures are on a common shaft 96 and form a modular unit. However, it is to be understood that a modular unit could comprise a greater or lesser number of armatures. Adjacent shafts 96 are mechanically connected together at their ends by suitable means, such as the bolts 98 shown in FIG. 3. Referring to FIG. 1, it is seen that the lower end of the bottommost shaft 96 is supported for rotation by means of a bearing 98 and the upper end of the uppermost shaft 96 is mechanically connected or coupled to flanged shaft 66 of rotor 60 of alternator 56. Thus, the bearings 62 and 64 of alternator 56 also afford support for the rotation of the armatures 72 of the motors 54. Grouping of a plurality of armatures 72 on a common shaft in the form of modular units is very desirable in a large device such as converter 16 since it facilitates the manufacture, assembly and servicing of converter 16.

It is to be understood that when rotor 60 and the bearings 62 and 64 of alternator 56 are removed, as hereinbefore described, the armatures 72 of the motors 54 which are grouped on the same shaft 96 are removable as modular units for servicing by crane 22 axially through the opening in stator 58 of the alternator. As described hereinbefore, the brush holder assemblies 78 of the motors 54 are adapted to accommodate the axial passage of the armatures 72 when their brushes 80 and 82 are unsprung.

FIG. 4 discloses a portion of a converter 100 similar to that disclosed in FIGS. 1, 2, and 3 but employing only one-half as many motors as in converter 16 hereinbefore described. It is to be understood that converter 100 is adapted for use with a generator which is substantially identical in all respects to MHD generator 12. Converter 100 is understood to comprise eight motors 102 and each motor 102 is adapted to be energized from two pairs or sets of terminals on MHD generator 12. Whereas converter 16 employed an arrangement wherein four armatures 72 were disposed on a common shaft 96 to provide a modular unit and each motor 54 was energized from one set or pairs of terminals on MHD generator 12, converter 100 employs an arrangement wherein two armatures 104 are disposed on a common shaft 106, which is the same in all respects to shaft 96 hereinbefore described. However, in converter 100, a commutator 107 on each armature 104 is adapted to accommodate a brush holder assembly 108 which carries four brushes 110, 112, 114 and 116. The brushes 110 and 114 are understood to be connected, as by means of conductors 118 and 120, respectively, to one pair of terminals 48 and 52 on MHD generator 12 and the brushes 112 and 116 are understood to be connected, as by means of conductors 122 and 124, respectively, to an adjacent pair or set of terminals on MHD generator 12. This arrangement is possible because the potential difference between adjacent sets or pairs of terminals on MHD generator 12 is usually small. Each motor 102 in converter 100 is provided with field coils 126 and the latter are connected by a conductor 128 with a control unit 130, similar to control unit 94 hereinbefore described, for automatically regulating field strength to synchronize the torque of all the motors 102. Aside from the differences noted above, converter 100 is understood to be constructed and to function in substantially the same manner as converter 16 hereinbefore described.

The embodiment of the invention disclosed in FIGS. 1, 2 and 3 operates as follows. Assume that MHD generator 12 is in operation and that the sets or pairs of terminals along each side are energized. Each pair of terminals effects energization of motor 54 with which it is associated to effect rotation of the armature 72 thereof. Control unit 94 for each motor 54 automatically compensates for any difference in potential existing between sets or pairs of terminals on MHD generator 12 and all the armatures 72 rotate at the same speed and at proper torque to effect rotation of rotor 60 of alternator 56. Since alternator 56 has an A.C. output, the D.C. output from MHD generator 12 is effectively inverted.

The embodiment of the invention disclosed in FIG. 4 operates in a similar manner except that each motor 102 is energized from two adjacent sets or pairs of terminals on one side of MHD generator 12.

Having now particularly described and ascertained the nature of my said invention and the manner in which it is to be performed, I declare that what I claim is:

1. In an electrical power plant, in combination, an electrical power generator having power output terminals along its length, and converter means for said generator, said converter means comprising a plurality of motors having their armatures in axial alignment and mechanically connected together, each of said motors being disposed adjacent the power output terminals from which it is energizable and said converter means further comprising a rotating electrical machine having a stator and a rotor in axial alignment with said motors and adapted to be driven thereby.

2. The combination according to claim 1 wherein the armatures of at least two of said motors are mechanically connected together and are removable as a unit axially through said stator.

3. In an electrical power plant, in combination, an electrical power generator having power output terminals along its length, said terminals having different electrical potentials with respect to each other, and converter means for said generator, said converter means comprising a plurality of motors having their armatures in axial alignment and mechanically connected together, each of said motors being disposed adjacent the power output terminals from which it is energizable, control means connected to each motor to synchronize the torque of said motors despite differences in the electrical potential applied to each motor, and a rotating electrical machine in axial alignment with said motors and adapted to be driven thereby.

4. In an elecrical power plant, in combination, an electrical power generator having spaced apart power output terminals disposed vertically therealong, and converter means for said generator, said converter means comprising a plurality of motors which have their armatures axially aligned in a vertical arrangement and mechanically connected together, each of said motors being disposed adjacent the power output terminals from which it is energizable, and said converter means further comprising a rotating electrical machine located above said motors and adapted to be driven thereby, said electrical machine having a stator and a rotor in axial alignment with and connected to said armatures.

5. The combination according to claim 4 wherein the armatures of at least two of said motors are adapted for removal as a unit axially through said stator.

6. In an electrical power plant, in combination, an electrical power generator having spaced apart sets of power output terminals disposed vertically therealong, said sets of terminals having different electrical potentials with respect to one another, a plurality of electric motors in vertical arrangement alongside said generator, each of said motors comprising an armature and field windings, the armature of each of said motors being disposed adjacent a set of terminals from which it is energizable, and the armatures of said motors being in axial alignment and mechanically connected together, control means connected to the field windings of said motors to vary the field strength of each motor to synchronize the torque of said motors despite differences in the electrical potential applied to the armatures of said motors, and a rotating electrical machine located above said motors and adapted to be driven thereby, said machine having a stator and a rotor in axial alignment with and mechanically connected to said armatures for rotation thereby.

7. The combination according to claim 6 wherein each of said armatures comprises a commutator which is he same diameter as the armature and wherein there is provided a brush holder assembly for each commutator, said brush holder assembly for each motor being of sufficient diameter to accommodate the axial passage of the armature after the brushes in said brush holder assembly have been unsprung.

References Cited in the file of this patent

UNITED STATES PATENTS

| | | |
|---|---|---|
| 571,270 | Kelly | Nov. 10, 1896 |
| 1,104,785 | Dunn | July 28, 1914 |
| 1,227,413 | Ferris | May 22, 1917 |

FOREIGN PATENTS

| | | |
|---|---|---|
| 1,116,801 | Germany | Nov. 9, 1961 |